United States Patent
Hentschel

[19]

[11] Patent Number: 6,038,765

[45] Date of Patent: Mar. 21, 2000

[54] PROCESS AND DEVICE FOR CONNECTING A CORD MADE OF FILAMENTS TO A DRILLED HOLE OR SHEATH

[75] Inventor: Wolfgang Hentschel, Schopfheim, Germany

[73] Assignee: Auto Kabel Managementgesellschaft mbH, Hausen i.W., Germany

[21] Appl. No.: 09/116,755

[22] Filed: Jul. 16, 1998

[30] Foreign Application Priority Data

Jul. 18, 1997 [DE] Germany .............................. 197 30 927

[51] Int. Cl.[7] .............................. H01R 43/00; B65H 51/18
[52] U.S. Cl. ............................................... 29/857; 226/162
[58] Field of Search .............................. 29/516, 517, 518,
29/748, 857, 858, 859, 862, 863, 867, 868,
872; 226/162, 134

[56] References Cited

U.S. PATENT DOCUMENTS

| 1,748,765 | 2/1930 | Hellermann . | |
|---|---|---|---|
| 1,931,176 | 10/1933 | Bair . | |
| 3,085,313 | 4/1963 | Macy . | |
| 4,552,294 | 11/1985 | Rotzler | 226/142 |
| 4,715,099 | 12/1987 | Yoshida | 29/33 M |
| 4,745,828 | 5/1988 | Stepan . | |
| 5,208,977 | 5/1993 | Ricard | 29/861 |

FOREIGN PATENT DOCUMENTS

| 2 595 028 | 2/1986 | France . |
|---|---|---|
| 40 13 834 | 10/1991 | Germany . |
| 42 06 067 | 9/1992 | Germany . |
| 42 21 828 | 8/1993 | Germany . |
| 43 03 122 | 8/1994 | Germany . |
| 43 12 990 | 10/1994 | Germany . |
| 3-152891 | 6/1991 | Japan . |
| 8-222343 | 8/1996 | Japan . |
| 2 070 469 | 9/1981 | United Kingdom . |

OTHER PUBLICATIONS

Search Report from corresponding Euroopean Patent Application No. 98 110 863.2 dated Oct. 5, 1998.

*Primary Examiner*—Lee Young
*Assistant Examiner*—Bobby Rushing, Jr.
*Attorney, Agent, or Firm*—Akin, Gump, Strauss, Hauer & Feld, L.L.P.

[57] ABSTRACT

A cord (3) which consists of a plurality or a bundle of individual filaments (2), especially individual wires, can be inserted into an opening (4) with a stripped or bare end (1), even if the filaments (2) are spread out at this end (1). The cord is grasped near the free end (14) of the bare filaments (2), and the filaments (2) are pressed together over the total circumference of the cord. The free end of the cord is provided with a contour which corresponds to the receiving opening (4). The compacting occurs for this purpose in such a manner that opposite the pressure position a projection at the free end (14) still remains, which now in this contoured shape fits and is inserted into the opening (4). Thereafter, the bundle of filaments (2) is then pressed together again at a slight distance from the opening (4), and by this aforementioned distance is inserted into the opening (4) or the sheath (5). This is then repeated stepwise until the entire end (1) of the cord (3) is inserted into the opening (4), so that the sheath (5) can thereafter be compacted.

8 Claims, 2 Drawing Sheets

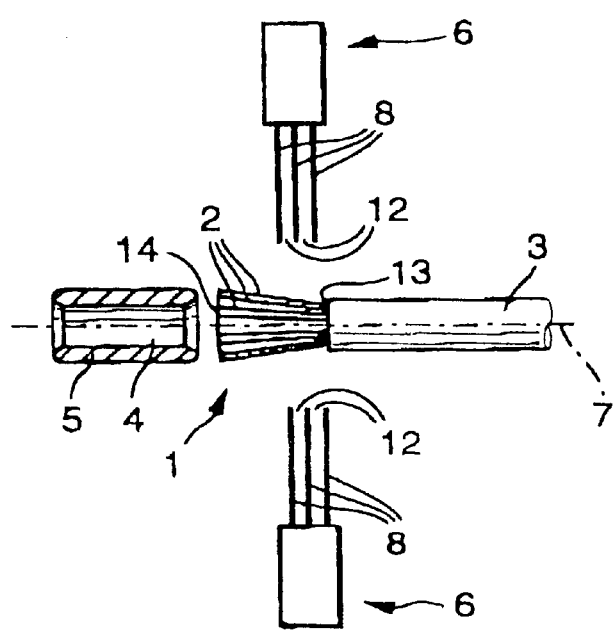
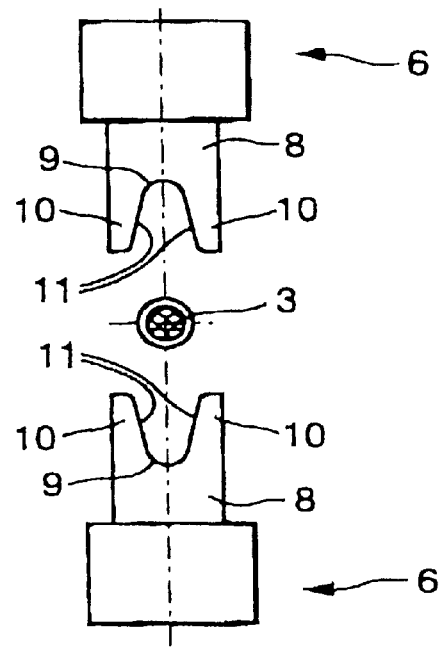
Fig. 1          Fig. 2
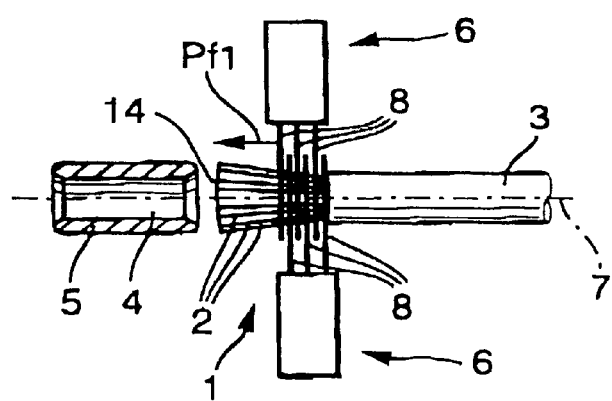
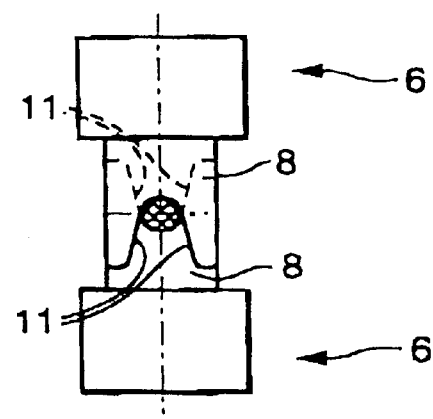
Fig. 3          Fig. 4

PROCESS AND DEVICE FOR CONNECTING A CORD MADE OF FILAMENTS TO A DRILLED HOLE OR SHEATH

BACKGROUND OF THE INVENTION

The invention involves a process for connecting the end of a cord consisting of a plurality or a bundle of filaments, for example made of individual wires or individual fibers, to a drilled hole or the like having a mounting part, or to a sheath, such that the filaments, individual wires or individual fibers can be inserted into the drilled hole or sheath and thereafter pressed together.

The invention involves, furthermore, a device for connecting a cord consisting of several filaments in particular wires or fibers, to a part having a drilled hole, a sheath, or the like, by inserting the end of the cord into this drilled hole or sheath.

Until now, it has been known to insert a cord made of individual fibers, individual wires or similar filaments with its end into a drilled hole or a sheath, more or less by hand. This has the problem that, for example, the individual wires of a stripped end of a cable have the tendency to spread somewhat, thus increasing the total diameter and upon insertion into the opening of the drilled hole or sheath to partially miss the mark (i.e, the opening of the hole or sheath), so that individual wires are buckled, bulged out, and bent. This means that not all wires or filaments go into the opening provided. The wires which are not inserted into the opening must be cut off, which on the one hand means an additional work expenditure and, furthermore, these individual wires are then missing in the electronic cross-section. If, in the process, these wire ends which are not inserted into the opening are not carefully removed, there is even the danger of a short circuit and/or the danger of an injury when the cable is later installed. If too many of the wires are thereby not grapsed, but instead are cut off, the required or desired electric transition resistance will also not be achieved, in spite of the pressing.

SUMMARY OF THE INVENTION

An object is therefore to create a process of the type desribed at the outset, by which possibly all filaments, in particular wires of an electric cable, can be grasped and inserted into a provided drill hole or opening or sheath. Furthermore, an object is to create a device for performing this process.

To achieve these objects, the process described at the outset is characterized in that the cord is grasped near the end of the bare filaments, individual wires or fibers, these are pressed together over the entire circumference of the cord which is formed by them, that thereafter the projection of the filaments, which is present opposite the grasped position at the free end of the cord, is introduced into the drill hole, opening or sheath. Thereafter, a pressing tool functioning for the pressing together releases the pressure exerted on the circumference, and is applied again offset in the axial direction from the drill hole, opening or sheath, so that the cord is pressed together again over the entire circumference at a distance from the entrance into the opening. The cord is then shoved further into the opening, and this is repeated stepwise until the total lengthwise area of the end of the cord which is to be inserted, is inserted into the drill hole, opening, or sheath with the desired dimension, and thereafter the compacting occurs.

In this manner, filaments or wires which are somewhat spread out relative to the cord or its cross section are thus grasped near the end and pressed together and thereby brought to a cross section which is possibly somewhat smaller than that of the opening, drill hole or sheath, into which the end of the cord is to be inserted. The position which is pressed together and grasped in this process leaves free a short projection end of a type such that it has the desired outer dimension and can be inserted into the corresponding opening without problems, wherein either the cord or the part which has the opening can be moved in the axial direction of the cord. Thereafter, the same step is repeated on this cord at a small distance from the front side of the sheath or at a small distance from the opening, so that a part of the cord which has not yet been inserted into the opening is thus also not bulged out when shoved further into the narrow opening.

Short sections of cord are thus inserted and shoved into the opening repeatedly in steps after a corresponding compacting, wherein the length of the respective part of the cord, located between the position of compacting and the beginning of the opening, is so measured that the inherent strength is sufficient to prevent a bulging out or bending out of the filaments or wires in this intermediate area, even if a relatively large frictional force occurs on the inner side of the opening during insertion, because the total cross-section of the cord, in the compacted condition, corresponds approximately to that of the opening. However, since the cord is simultaneously compacted or pressed together repeatedly near the opening, and then shoved forward, the resulting frictional force can be kept as small as possible.

The process thus provides that step by step, the end of a cord consisting of individual filaments is inserted into an opening without the individual filaments thereby buckling and being spread or bulged out of the cord. In this way, it is no longer necessary to remove filaments or wires which were not inserted into the opening. Furthermore, especially for cable cords or even stripped ends of such cables, a good connection with a sheath having the desired electrical resistance is possible, so that the process is especially advantageous for this application.

It is expedient for this purpose if the compacting of the cord is effected at such a distance from its end that the projection of the individual filaments, wires or fibers is shorter than their buckling lengths, and if the thereafter occuring compacting is effected at a distance from the opening, drill hole or sheath, which is in turn smaller than the buckling length of the filaments, wires or fibers. From this results the advantage already mentioned above that, upon insertion and during shoving in, in spite of the friction which results in this process, the filaments are not bulged out, or are not bulged out in such a manner that they can no longer be inserted.

Another especially advantageous and expedient embodiment of the process can consist in that the end of the cord to be inserted into the opening, drill hole or sheath is first grasped at a larger distance from its free end, is pressed around its circumference, and is combed out toward the free end in such a way that the filaments, wires or fibers are arranged in a substantially axial direction, whereafter compacting near the free end and the subsequent stepwise insertion into the opening, drill hole or sheath occurs. This has the advantage that good grasping can be made at the end of a heavily frayed or spread cord, and in this process, there are no individual filaments or wires remaining unaccounted for. Moreover, as small a cross-section of the cord as possible can be formed at its free end with even greater certainty, wherein at first filaments which are oriented differently relative to each and are possibly running diagonally, and might even cross each other, can be arranged in order, which likewise contributes to a reduction of the total cross-section. This applies especially for cables of the type having individual wires which are at least partially twisted as braids, so that they have an especially strong tendency to a somewhat coiled spreading after being stripped.

The process depicted above can also be applied especially for connecting a cord having a casing, for example an insulated cable or a Bowden pull wire, consisting of a plurality of individual wires and the casing, in which at first the casing is removed at least to a certain length, or the cable is stripped at the end to a certain length which is to be connected, such that it can be inserted into an opening, drill hole or sheath, and that after that, the pressing together of the wire ends and the insertion into the opening, drill hole or sheath take place.

Insulated cables of this type have the particular tendency that their stripped end spreads to a relatively large extent, because the individual wires are also partially twisted together under a certain tension, and this tension can release by the removal of the casing A stripped end of a cable, therefore, frequently has at first a considerably larger total cross-section than the cable itself or, even more, than the metal core of this cable. By the procedural method according to the invention, in order to compact this end in steps over the total circumference—expediently using a suitable tool—and to insert the small projection opposite the pressure point into the opening, it is thus possible to insert such greatly fanned out or spread out cable ends into openings or sheaths, without individual wires not being grasped. By the process according to the invention, it can also be prevented that individual wires are not grasped.

The device already mentioned at the beginning for performing the process according to the invention is characterized by a tool for compacting—previously already mentioned briefly as the "pressure tool"—having at least two approximately fork-shaped jaws which are movable tranverse to the center axis of the cord and in opposite directions to each other, whose an inner contour corresponds respectively to the partial curved segment of the circumferential area of the cord grasped by them, wherein the jaws continue respectively beyond the contour of the cord grasped by them and beyond its center, such that these continuations form the prongs of the fork-shaped jaws and have a spacing corresponding to the cross-sectional thickness of the cord, and wherein these jaws are offset from each other in the axial direction of the cord in such a way that they overlap each other with the prong-shaped continuation in the closed position.

Thus, in this way, a generally round cord shape can be compacted over its total circumference using at least two, optionally also three, parts which can be moved in opposite directions, because the partial circumferences which are grasped by the jaws add up to a total circumference of the cord, and thus provide, by the prongs going out from the contact points of the jaws, that no filaments can escape from the pressure area of the tool when closing this cross-section. By the aforementioned prong-shaped continuations, moreover, each partial tool, previously also described as a "jaw", actually has a larger inner contour than that corresponding to the grasped partial area of the cord, wherein these jaws, however, then press the cord onto the respective inner contour of the opposing jaw by their opposite directional movements. Thus, even using two jaws, which on the one hand have an approximately semicircular inner contour and continuations connected to it, a cord which is circular in cross-section can be pressed together over the entire circumference. Furthermore, cords of other cross-sectional shapes can also be pressed together in this way, if the inner contour of the jaws has a corresponding shape.

It is especially advantageous if the prong-shaped continuations on the jaws, projecting over the center of the cord, each have a lead-in bevel on their free ends, which in particular can run up to approximately the level of the cord center. This makes it easier to grasp a cord in an area which at first assumes too large a cross-sectional area by the spreading out of the individual filaments. Even the first time the jaws of the tool are brought together, the cord is then gradually pressed together to the desired cross-sectional size, whereupon another later compacting can then occur, until the jaws completely overlap with their continuations, and only their actual inner contours, which correspond to the outer contour of the cord, lie on the cord.

Since the jaws should overlap, they must be somewhat offset from each other in the axial direction. So that this does not lead to a change in direction within the cord in the area of the compacting, it is advantageous if the pressure tool has more than two jaws offset axially from each other, and if these jaws arranged one behind the other in the axial direction, respectively alternating in from different sides, especially from sides which oppose each other, toward the cord or a cable, and are adjustble in opposite directions to each other and can be moved away from each other. For example, three jaws from each of the two sides, or three jaws from one side and two jaws from the other side, arranged at the level of the intermediate space of the three jaws, are provided and can be moved in opposite directions. The jaws complement each other to form a pressure tool having a total of five or six (if necessary even more) jaws, which grasp the circumference of a cable or cord respectively in pairs and can press it together. Thus, in this preferred embodiment, the tool is made up of a bundle of jaws lying opposite each other in respective pairs but axially somewhat offset, which can grasp and press together in total a sufficiently long length of the cord, in order to rule out to the greatest extent possible any changes in direction of the filaments or wires in the area of compacting.

For the stepwise compacting or a first compacting and combing out, the pressure tool can be adjusted in the axial direction in its entirety with its jaws, especially with the jaws moved apart from each other. This means that the jaw bundles can be adjusted synchronously in the axial direction and certainly in the open position, in order to grasp a new position on the cord and in the closed position, in order to perform the combing out and/or the insertion into a opening.

However, it is also possible that over the entire length of the end of the cord to be inserted, jaws for compacting by opposing action are distributed in the axial direction and arranged respectively in opposing directions to each other, and the individual jaws can be respectively pulled back individually into their open position in progression for pushing into an opening or sheath or a part having a drilled hole, so that a respective part of the cord is released each time for further pushing in.

It is thus possible to either move the pressure or pressing tool with its jaws—apart from its opening and closing movement—in the axial direction or instead to design the jaws to be adjustable only in the opening and closing movement, and instead of this to push the part which has the opening or drill hole or a sheath respectively further onto a cord and, to a certain extent respectively "at the last possible moment", to bring the jaw or jaws, which are next to the opening, into the open position. While for this purpose a device having a tool which can also be moved in the axial direction has the advantage of being able to be used for practically any lengths of cord end segments, the arrangement, which is preferably non-axially movable, must be provided respectively for different lengths having different numbers of these jaw pairs which can be moved in opposing directions.

For an effective compacting, which is also efficacious with relatively small force expenditure, it is advantageous if the jaws are thin in the axial direction or flat, so that even in the axial direction only very small distances between adjacent jaws are necessary, and if they are manufactured particularly from sheet metal or plastic and have a thickness or size in the direction of the cord of, for example, approximately one half millimeter to three millimeters, preferably of approximately one millimeter to two millimeters. For this purpose, the distance between two jaws which are adjacent in the axial direction need then only be slightly larger than the thickness of the respective opposing jaw. The filaments of a cord can be grasped appropriately tightly and firmly and pressed together.

On the whole, a process and a device result with which the often spread out ends of a cord consisting of individual filaments, especially of individual wires, can be pressed together in a mechanized or automated form, so that they can be inserted into a narrow opening or drill hole practically without losses of individual filaments or wires, which avoids expensive manual work with its associated inadequacies.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings in highly schematic representation:

FIG. 1 is a longitudinal section through a sheath having an opening in its interior and a side view of a cord made of individual wires, namely a cable, which is stripped on its end so that the individual filaments or wires have spread somewhat, with a side view of a schematically represented tool having three respective jaws which are movable towards each other and away from each other and for this purpose are offset in the axial direction, so that the jaw of one tool meshes respectivley in the gap of the other tool;

FIG. 2 is an end view of the arrangement according to FIG. 1 having a cord and the jaws of the tool according to FIG. 1 in the open position, from which it can be recognized that the jaws have respective semi-circular inner contours and fork-shaped continuations widening out from there for grasping the spread end of the cable;

FIG. 3 is a representation corresponding to FIG. 1 after closing the jaws of the tool and the enclosing of the cord at a distance from its open end;

FIG. 4 is an end view of the arrangement according to FIG. 3, from which it is clear that the respectively opposing jaws grasp the entire circumference of the cord in the closed position and compact it to the desired cross sectional shape and outer contour.

Figure 5:
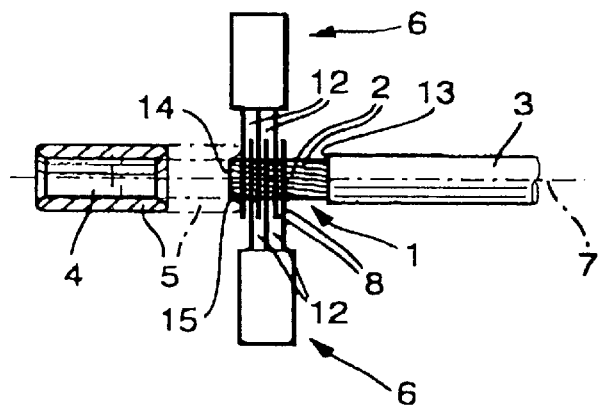
FIG. 5 is a representation corresponding to FIG. 3, in which a relative movement between tools and cord or cable is carried out in the axial direction, in such a way that only a short projection of the free end is still available opposite the tool and can be inserted into the opening of the sheath without buckling or bulging.

All of the figures depict in a schematic manner the process progression for connecting a cord end to a sheath or opening.

DETAILED DESCRIPTION OF THE INVENTION

For connecting the end 1 of a cord 3 which is made of a plurality of filaments 2 (individual wires in the embodiment shown) to a mounting part having an opening 4 (a sheath 5 in the embodiment shown), it is necessary to compact (press together) the filaments 2 which are at first spread according to FIG. 1, so that they fit into the relatively narrow opening 4. The cord 3 in the embodiment is thus a cable, which consists of individual wires, which, as a rule, automatically spread when the end 1 is stripped, because they are for the most part wound around each other and twisted with each other, and are under a certain tension. These filaments 2 should be inserted into the opening 4 and then pressed with the sheath 5, in order to create a fixed and flawless electrical connection.

In the same manner, however, the ends of Bowden pull wires can be connected to their corresponding mounting parts.

It is shown and indicated in the drawings that as a device for this connecting of the spread ends 2 to the sheath 5, a tool 6 is provided for compacting, which has respective multiple sets of two jaws which can be moved transverse to the center axis 7 of the cord 3 and in opposite directions to each other and are designed approximately fork-shaped according to FIG. 2. In FIGS. 1 and 2 they are depicted, in a position moved away from each other; in FIGS. 3 to 6 they are depicted in a position moved towards each other and exerting pressure; and in FIG. 7, they are depicted again in the open position.

These jaws 8 each have an inner contour which corresponds to the partial sleeve curve of the circumferential area of the cord 3 grasped by them. In the embodiment, this is approximately a semi-circle 9. Furthermore, the jaws 8 each continue, however, beyond the contour which is grasped by them and thus also beyond this inner contour 9, so that they are designed approximately fork-shaped. The continuations 10 which run further opposite the inner contour 9 thus form the prongs of this "fork" and have, at least at their starting position on the inner contour 9, a separation distance corresponding to the cross-sectional thickness of the cord 3, which in the embodiment shown thus corresponds to twice the radius of the semi-circle 9.

In this regard, one recognizes in FIGS. 2 and 4, that the prong-shaped continuations 10 on the jaws 8, projecting beyond the center of the cord, each have a lead-in bevel 11 on their free ends, which reaches up to the level of the cord center or up to the inner contour 9 in the embodiment shown. It is clear that in this manner even a greatly fanned out end 1 of a cord 3 can be grasped in such a way that no individual filaments 2 or wires can avoid the enclosing inner space between the two associated jaws 8, thus all individual filaments or wires 2 are grasped and surrounded with certainty.

Figure 6:
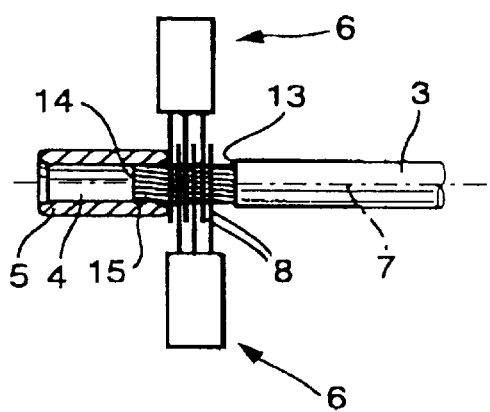
FIG. 6 is a representation corresponding to FIG. 5, in which a part of the end of the cord has already been inserted into the sheath, and the tool for advancing must be brought into the open position again, in order to be able grasp another area of the cable somewhat spaced from the sheath.

Here it is recognized at the same time, especially in FIGS. 3 and 6, that these jaws 8 are offset in an axial direction of the cord 3 in such a way that in the closed position they can overlap with their prong-shaped continuations 10.

FIG. 4 makes clear that after the moving together of the originally spaced jaws 8 lying opposite each, a closed circumference is formed by their inner contours 9 corresponding to the circumference of the cord, wherein, however, the individual filaments 2 are then pressed together to a desired dimension. During the moving together of the jaws 8, this occurs gradually because of the lead-in bevels 11 and is finally completed by the complementing inner contours 9 of the jaws 8 acting together.

In this regard, one recognizes in FIGS. 1, 3, 5, 6 and 7 that this pressure tool 6 has more than two, namely three jaws 8 coming from both sides, respectively axially offset from each other, and that these jaws 8 arranged one behind the other in the axial direction, respectively alternating from different sides, namely from opposite sides, can be advanced toward the cord 3 or a cable and likewise toward each other, and can be moved away from each other, where the opposing offset is selected such that the jaws 8 of the one side can be moved into the intermediate spaces 12 between the jaws 8 of the other side and fit into these intermediate spaces. This is clear especially in FIGS. 3, 5 and 6.

Above all, the comparison of FIGS. 3, 5 and 6 shows, in addition, that the pressure tool 6 with its jaws 8 is adjustable as a unit in the axial direction relative to the cable 3 and its end 1, such that an adjustment in the combined position is also possible, as long as the full pressure of the jaws 8 has not yet been applied against each other. In this regard, this relative movement can also be realized thereby, in that the tool 6 is not moved or only partially moved axially, and the cord 3 is completely or partially moved.

This arrangement makes possible the following procedural method when connecting the end 1 of the cord 3 to the opening 4 of the sheath 5:

First, for a cable 3 or optionally also for a Bowden pull wire, the end 1 is freed of its casing, i.e. a cable is stripped, for example. This causes the filaments or individual wires 2 on this end 1 to spread out somewhat from each other on this end 1 relative to the remaining sheath 13 and thus to form the shape indicated in FIG. 1, in which the stripped end 1 assumes a larger cross-section, for the loosened mutual arrangement of the wires 2, than that corresponding to the opening 4.

The cord 3 and its end 1 are now grasped by the tool 6 and brought to an outer contour by the jaws 8 in the manner depicted in FIGS. 3 and 4, which corresponds approximately to that of the opening 4. In this regard, it is provided in this embodiment that the end 1 of the cord 3 to be inserted into the opening 4 or sheath 5 is grasped at first at a somewhat greater distance from its free end or its front side 14, is pressed on its circumference, and is combed out to its free end or its front side 14, in such a way that the filaments 2 or wires are now arranged in a substantially axial direction and, above all, are now also brought, near to this front side 14, at least to a large extent, to the contour which the cable 3 has prior to being stripped. This procedural step is indicated in FIG. 3 by the arrow Pf1, by which the pressure tool 6 then assumes the position depicted in FIG. 5.

Now the essential part of the process is implemented, in which namely the cord 3 is grasped near the end 14 of the bare filaments 2 or individual wires, and these are pressed together over the entire circumference of the cord 3 which is formed by them, so that the total cross-section is as small as possible and is, above all, equal to or even somewhat smaller than the opening 4.

Thereafter, the short projection 15, which is then present relative to the grasped position at free toward the open end 14 and is clearly recognizable, especially in FIG. 5, is inserted into the drill hole or opening 4 of the sheath 5 or another part. After that, the pressure tool 6 is released so that its jaws 8 move apart from each other again into the open position which is depicted in FIG. 2. Now, they can again be pressed together after a relative axial movement, as is indicated in FIG. 6, where FIG. 6 now depicts another step, namely further insertion. At first, the tools in turn grasp the end 1 of the cord 3 with a repeated pressing together at a distance from the sheath 5 and its opening 4, which corresponds approximately to the projection 15, where, however, this first projection 15 was already inserted into the opening. Finally, this further projection is moved into the opening 4 by the axial movement, whereby the end of this movement is depicted in FIG. 6.

Figure 7:
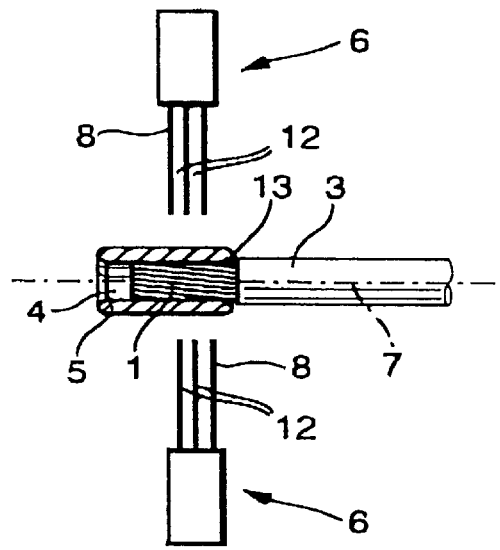
FIG. 7 is a representation corresponding to FIGS. 1, 3, 5 and 6 after the final insertion of the stripped end of the cable into the sheath, wherein the jaws of the tool are now again in the open position depicted in FIGS. 1 and 2.

This operation can be repeated many times and stepwise, until the longitudinal section of the end 1 of the cord 3 to be inserted is introduced into the drill hole or opening 4 of the sheath 5, according to FIG. 7, so that its compacting can then be done after that. The opening 4 of the sheath 5 and the inserted filaments 2 are pressed together and compacted as shown in FIG. 7.

Since at the beginning of the principally depicted process, at first according to FIG. 3, a compaction results for the last region of the end 1 to be inserted, this last part can also be moved into the sheath 5, without it having to be grasped once more by the tool 6.

It should be mentioned that the step depicted first according to FIG. 3, with the grasping at a distance from the front end 14 and the combing out, can also be omitted under certain circumstances, especially when the end 1 of the cord 3 is already relatively regular, so that then as the first step the compacting of the the end 1 according to FIG. 5 can take place using only a small projection 15, which projection 15 is then inserted into the sheath 5 in the manner described, after which this is continued stepwise until the end 1 to be inserted sticks into the sheath 5 to the desired depth.

Both the aforementioned projection 15 as well as the associated distance between the sheath 5 and the next adjacent jaw 8 are thus selected to be so short that the sections of the filaments 2 or wires located in between are shorter than their bending length, and thus cannot not bulge out or buckle during the process of being shoved together. Tests have shown that by a grasping of the end 1 with an appropriately short projection 15 and individual advancing feed steps with approximately the same dimensions, a stripped cable can be inserted without problems into a narrow sheath 5, without individual wires being deformed and thus the total connection becoming lost.

In this regard, it can also be recognized in the drawings that the individual jaws 8 are each very flat, so that the force acting on them generates sufficient pressure in order to press the filaments 2 together to the desired total contour, which fits into the sheath 5 or its opening 4. For this purpose, these jaws 8 can consist, for example, of sheet metal, but also of flat plastic pieces. For example, they can have a thickness or size in the direction of the cord 3 of from about one half millimeter to three millimeters, or under certain conditions even a little more, preferably of approximately one millimeter to two millimeters, whereby then a correspondingly small dimension of the spaces 12 and thus a secure grasping of the individual filaments 2 results, without these undergoing any changes in direction in the area of pressure.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A process for connecting a free end (1) of a cord comprising individual filaments (2) to an opening (4) defined by a continuous circumferential wall, wherein the filaments (2) are inserted into the opening (4) and thereafter the continuous circumferential wall and the filaments are pressed together, comprising grasping the filaments the cord (3) near a front side (14) of the filaments (2), compacting the filaments (2) together with a pressing tool (6) over an entire circumference of the filaments (2), inserting a projection (15) of the filaments (2), which is opposite the grasped position and projects towards the front side (14) of the Filaments, into the opening (4), releasing the pressing tool (6) and moving the pressing tool away from the opening (4) in a longitudinal axial direction of the cord (3), applying the pressing tool (6) again, so that the filaments are compacted again over the entire circumference at a distance from the opening (4), shoving the filaments further into the opening (4), repeating the releasing, applying and shoving stepwise until a total lengthwise area of the free end (1) of the cord (3) is inserted into the opening (4) to a desired dimension.

2. The process of claim 1, wherein the individual filaments (2) are wires, and the opening (4) is in a sheath of an electrical connection.

3. The process of claim 1, wherein the individual filaments (2) form a cable, and the opening (4) is a drilled hole in a mounting part for the cable.

4. The process according to claim 1, wherein the compacting of the filaments (2) of cord (3) is done at such a distance from the front side (14) that the projection (15) of the individual filaments (2) is shorter than a buckling length of the individual filaments, and subsequent compacting is done at a distance from the opening (4), which is smaller than the buckling length of the filaments (2).

5. The process according to claim 1, further comprising initially grasping the free end (1) of the cord (3) to be inserted into the opening (4) at a larger distance from the front side (14) than a desired incremental stepwise insertion distance of the filaments, then pressing the filaments over the entire circumference, and moving the pressing tool along the filaments toward the front side (14) in such a way that the filaments (2) are arranged substantially in the axial direction, and wherein compaction near the front side (14) and the subsequent stepwise insertion into the opening (4) then occurs.

6. The process according to claim 1, wherein the cord (3) has a casing (13), the process further comprising removing the casing (13) at least to a length which is to be inserted into the opening (4), prior to compacting the filaments and inserting them into the opening (4).

7. The process according to claim 6, wherein the cord (3) is an insulated cable and the casing (13) comprises insulation which is stripped from the free end (1).

8. The process according to claim 6, wherein the cord (3) is a Bowden pull wise.

* * * * *